Figure 3:
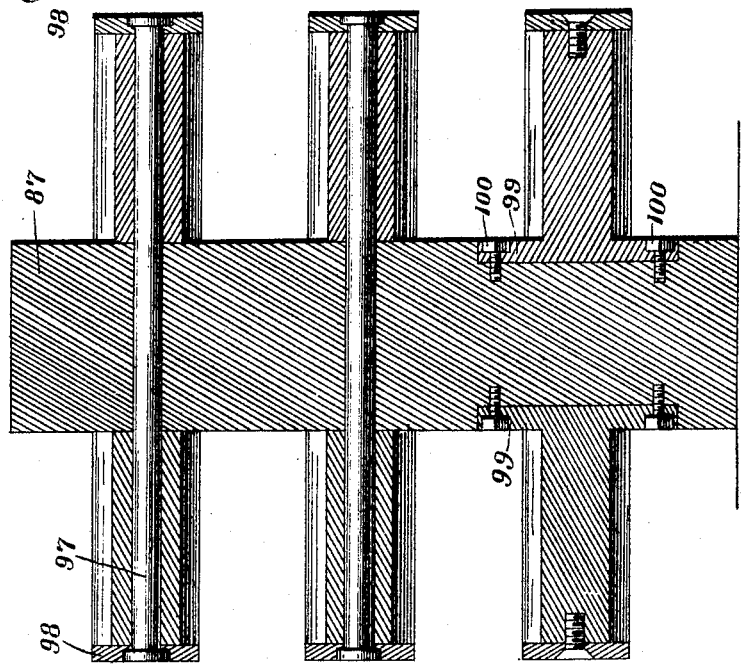

No. 794,611. PATENTED JULY 11, 1905.
R. H. GOLDSBOROUGH.
TURBINE.
APPLICATION FILED SEPT. 6, 1904.
6 SHEETS—SHEET 1.
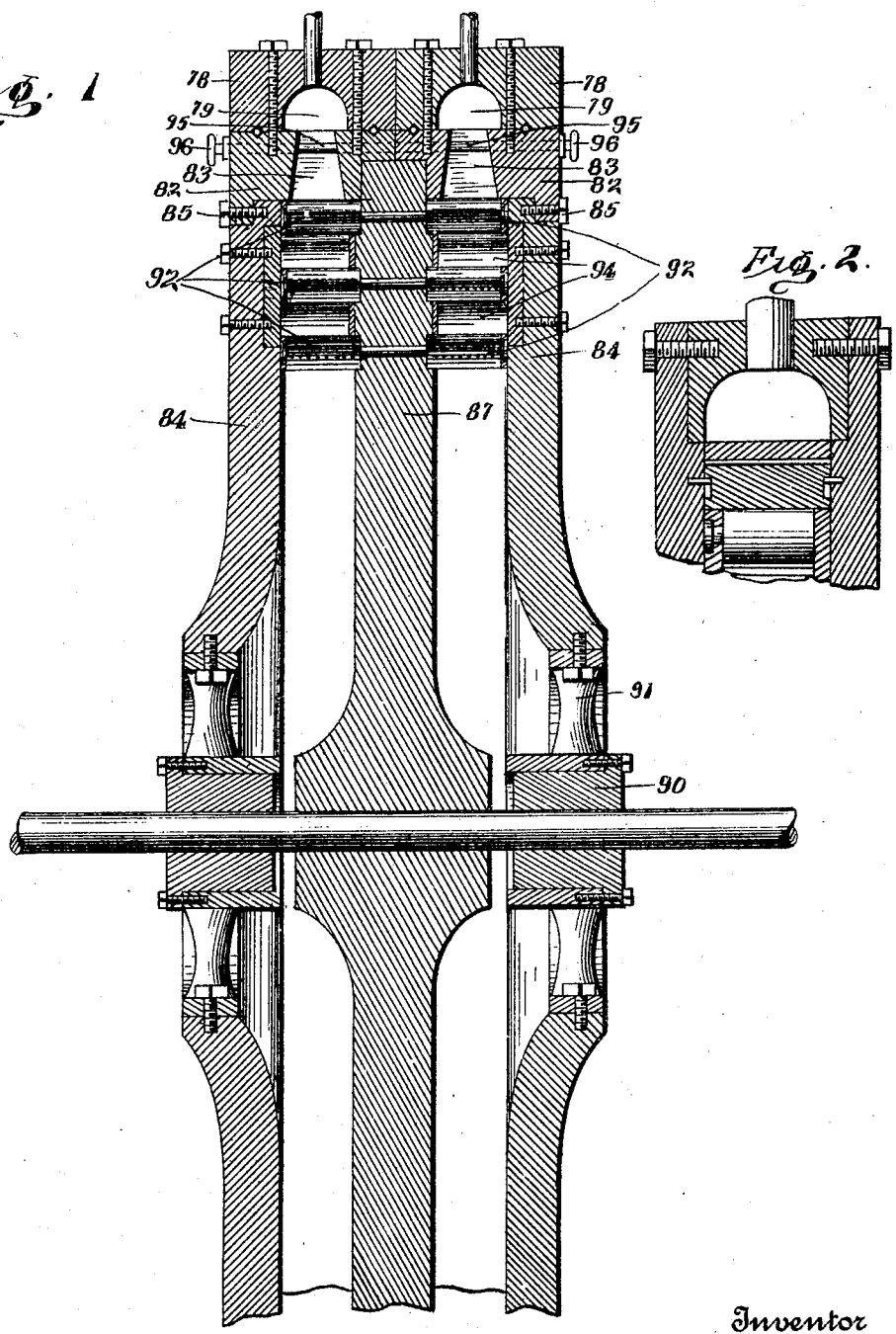
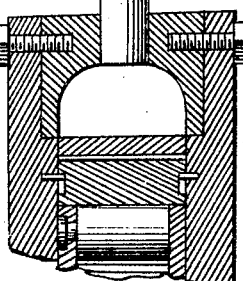
Witnesses
H. A. Holinette
J. G. Holohan
Inventor
Richard H. Goldsborough
by G. Ayres Attorney No. 794,611. PATENTED JULY 11, 1905.
R. H. GOLDSBOROUGH.
TURBINE.
APPLICATION FILED SEPT. 6, 1904.

6 SHEETS—SHEET 3.

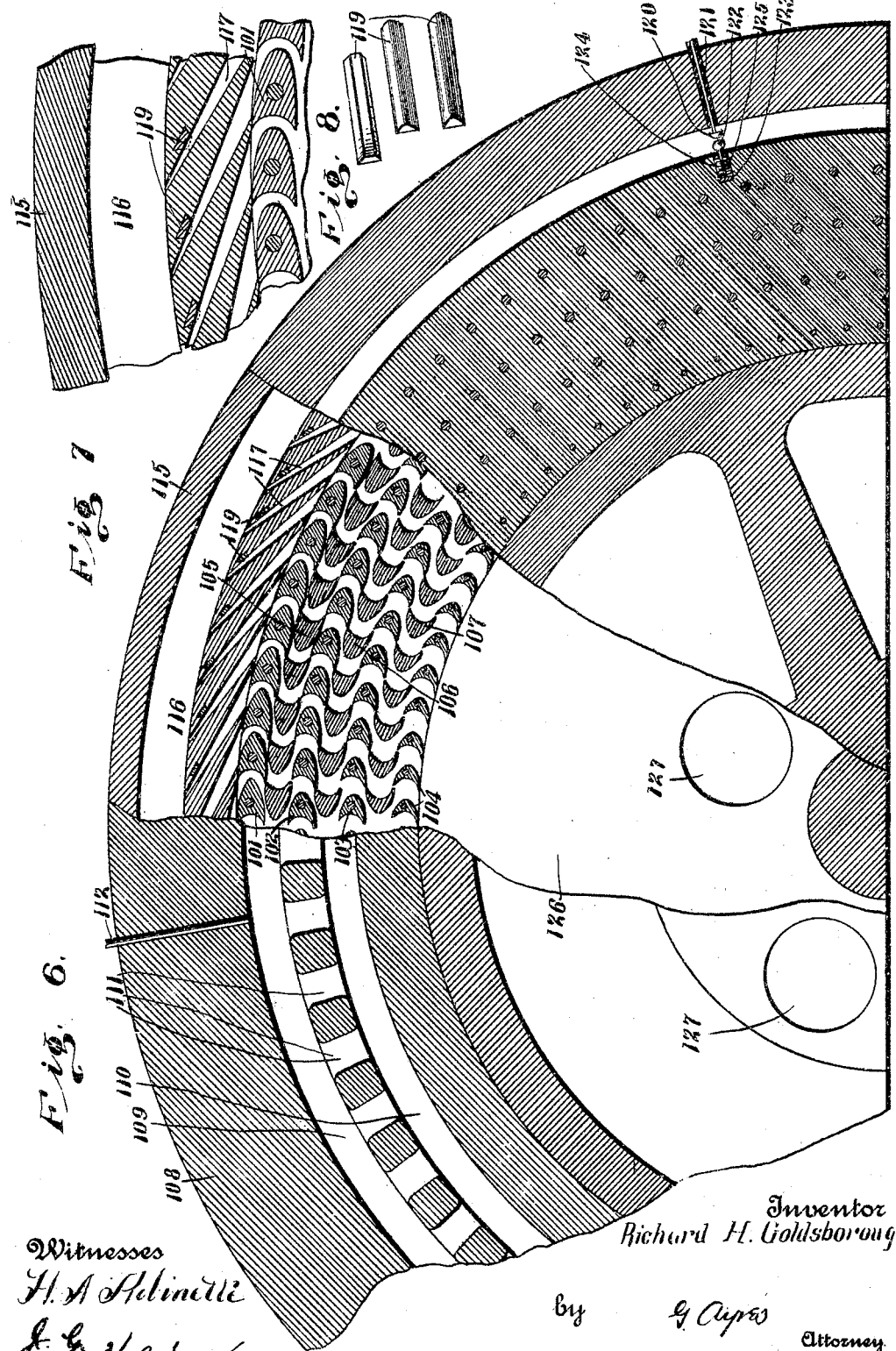

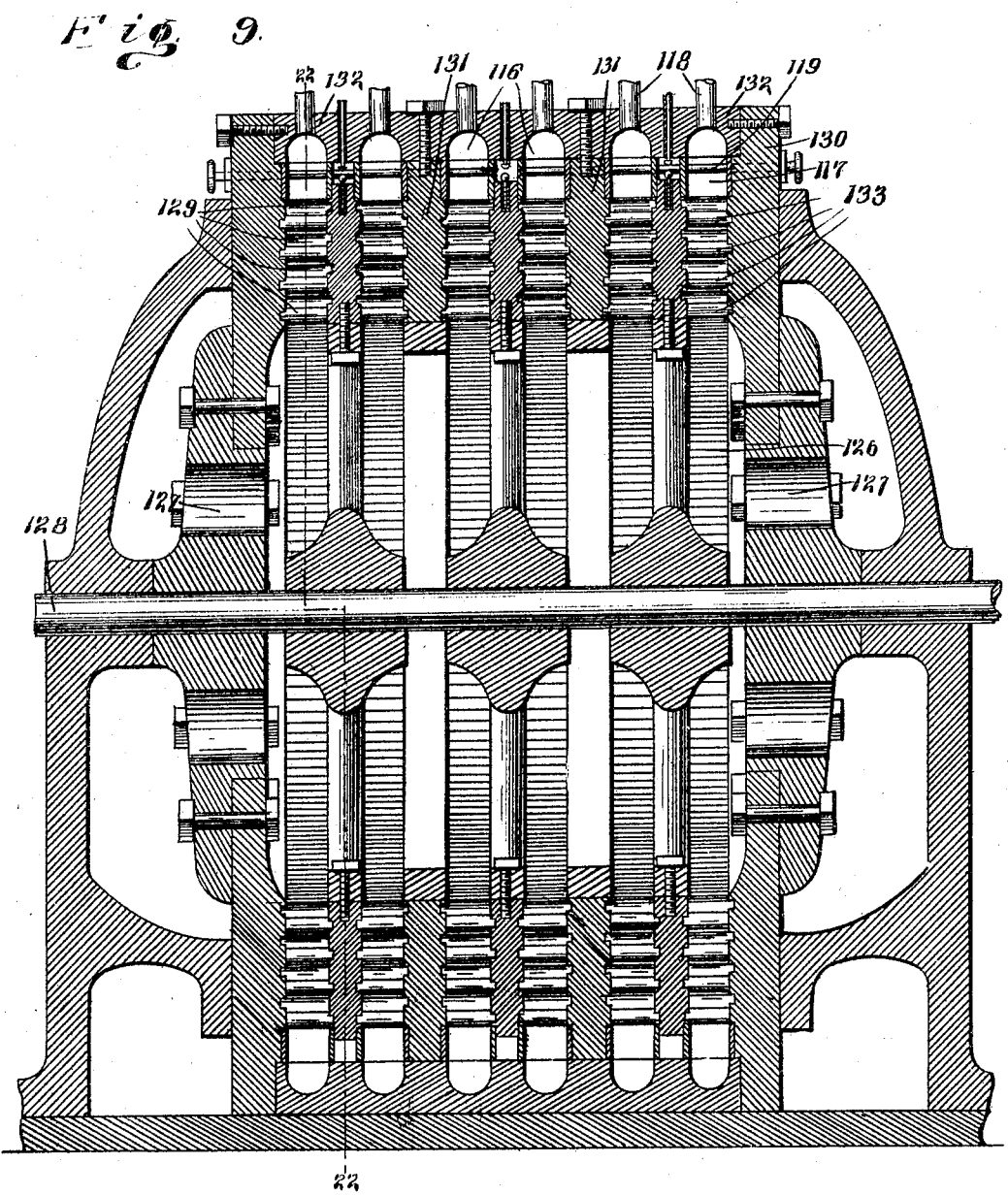

No. 794,611. PATENTED JULY 11, 1905.
R. H. GOLDSBOROUGH
TURBINE.
APPLICATION FILED SEPT. 6, 1904.

6 SHEETS—SHEET 6.

Witnesses
H. A. Holinette
J. G. Holohan

Inventor
Richard H. Goldsborough.

by G. Ayres
Attorney

No. 794,611.

Patented July 11, 1905.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 794,611, dated July 11, 1905.

Application filed September 6, 1904. Serial No. 223,427.

*To all whom it may concern:*

Be it known that I, RICHARD H. GOLDSBOROUGH, a citizen of the United States, residing at Washington, in the District of Columbia, have invented certain new and useful Improvements in Turbines, of which the following is a specification.

My invention relates to turbines; and it consists in the parts, constructions, and combinations herein described and claimed.

My invention relates particularly to a radial inward-flow turbine construction in which the difference in the radii of successive portions of radially-arranged steam passages or chambers acts to produce changes in the pressure and velocity of the steam-current flowing therethrough and to maintain the steam at the several points along said passages in a condition of pressure and velocity necessary for a highly efficient operation of the turbine. In this construction centrifugal force imparted to the steam by the rotating walls of the steam-passages augments the effect produced by the difference in radii of successive portions of said passages, and thereby acts efficiently to produce a useful effect.

The objects of my invention are to provide an improved construction in which the energy of the steam is utilized partially in the form of pressure and partially in the form of kinetic energy, the proportion between the quantities of energy utilized in said two forms being capable of wide variations to meet any requirements of speed or other conditions of practical operation.

My invention provides a simple and durable construction in which the steam can be efficiently employed at a low peripheral speed of the rotor, thereby furnishing turbines of high power with small diameters, whereby a high factor of safety in the strength of the rotating parts is obtained without unduly increasing the size and weight thereof.

A further object of my invention is to provide a compact construction in which the steam will be efficiently utilized at a low peripheral speed and which can be conveniently adjusted to vary the range of expansion of the actuating-steam.

A further object of my invention is to provide a simple and highly efficient means for imparting heat to the steam during its passage through the turbine.

Figure 4:
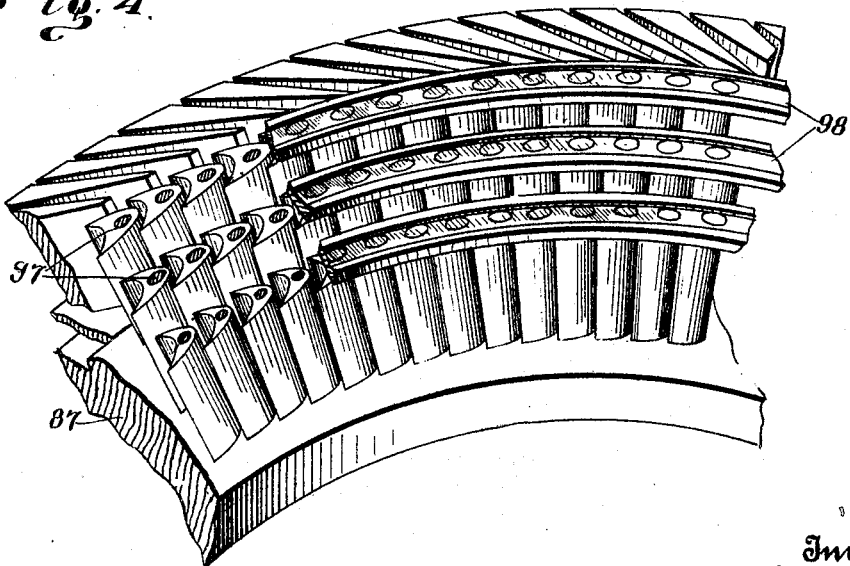
Figure 5:
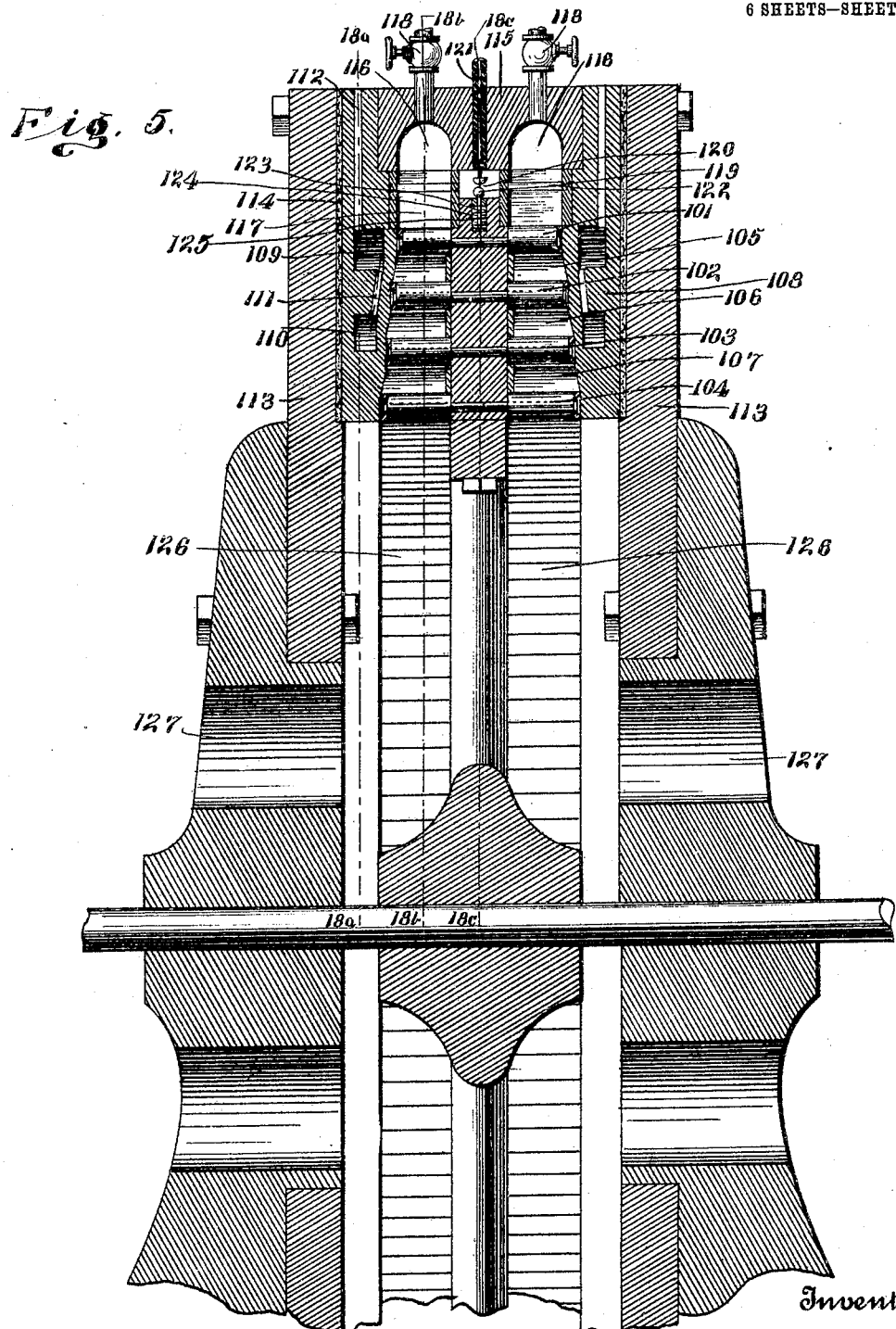
Figure 10:
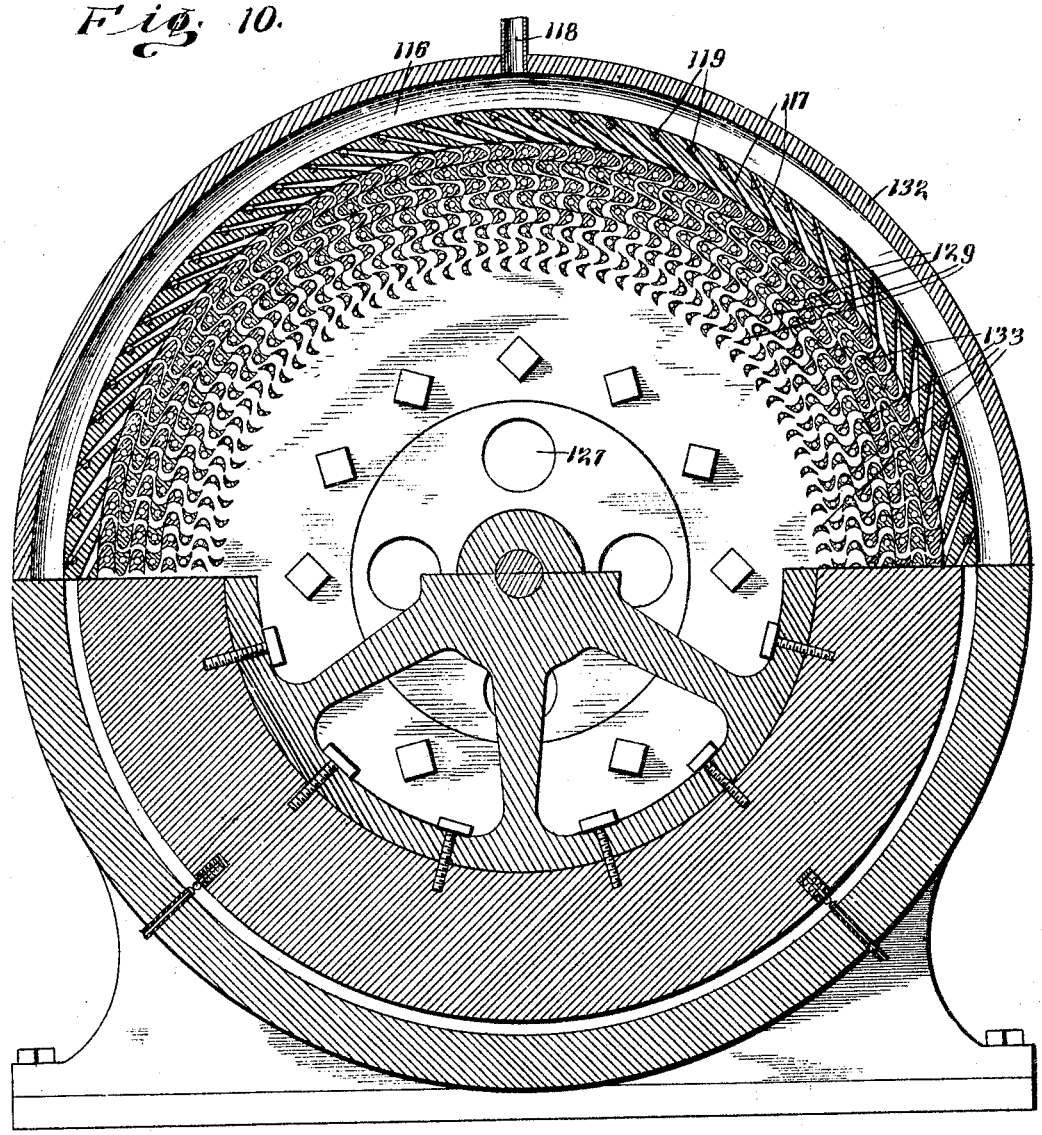

Referring to the accompanying drawings, forming a part of this application, and in which similar reference-symbols indicate corresponding parts in the several views, Figure 1 is an axial sectional view illustrating one embodiment of my invention. Fig. 2 is a detail sectional view illustrating a modified construction of the rings carrying the admission-ports. Fig. 3 is a detail sectional view, on a larger scale, illustrating preferred means for securing the vanes to their supporting-wheel in the construction shown in Fig. 1. Fig. 4 is a detail perspective view clearly illustrating the relative arrangement of the ports and moving vanes shown in Fig. 1. Fig. 5 is a view similar to Fig. 1, illustrating a modified construction provided with steam-heating chambers and automatic alarm devices. Fig. 6 is a fragmentary sectional view, on an enlarged scale, taken in part on the lines $18^a$ $18^a$, $18^b$ $18^b$, and $18^c$ $18^c$ of Fig. 5. Fig. 7 is a detail sectional view clearly illustrating the construction of the ports and their adjusting means. Fig. 8 is a perspective view of interchangeable adjusting means for varying the expansion of the steam in the admission-ports. Fig. 9 is a vertical axial sectional view illustrating a construction provided with a plurality of independent wheels on a common shaft, and Fig. 10 is a sectional view on the line 22 22 of Fig. 9.

Referring especially to Figs. 1, 2, 3, and 4 of the drawings, 78 indicates annular casing members formed with annular steam-chambers 79 and secured to the outer periphery of the annular port members 82, which latter are provided with a plurality of admission-ports 83 for conducting an actuating medium from the chambers 79 to the turbine-vanes. Heads 84 of the turbine-casing are secured to the port members 82, as shown, and provided with bearings 90 for the turbine-shaft 88, said bearings being removably secured to the heads by arms 91, which are constructed to permit ready escape of the exhaust-steam therebetween. A turbine-wheel 87, secured to the shaft 88, carries a plurality of concentric annular series of vanes 92, extending axially from each side, the corresponding vanes on the opposite sides of the wheel being secured thereto by a common bolt 97, which extends through both of said vanes and their shrouds 98. A set of concentric annular series of stationary vanes 94 is carried on a plate 80 in position to alternate with the concentric series of vanes on each side of the turbine-wheel, the plates 80 being adjustably secured to the adjacent casing-head 84 by bolts 81, thereby providing common means for simultaneously adjusting the several annular series of stationary vanes of each set. Each admission-port 83 is shown provided with a cut-away cylindrical plug 95, which is provided with an external hand-wheel 96 for adjusting said plug to vary the cross-section of the entrance portion of said port. In the operation of this construction steam is maintained at any desired pressure in the annular chambers 79, from which it is directed by the admission-ports 83 at an efficient angle against the outer periphery of the outermost annular series of movable vanes, the degree of expansion in said admission-ports being regulated by the controlling-plugs 95. A preferable construction is that in which the admission-ports are constructed to provide a double expansion of the steam while flowing therethrough. The steam is discharged inwardly from the first set of movable vanes 92 to the adjacent set of stationary vanes 94, which latter are constructed to direct it at an efficient angle against the second set of movable vanes 92. The steam is discharged from the second set of movable vanes inwardly to the next succeeding set of stationary vanes, which direct it at an efficient angle against the final set of moving vanes 92, from which it is discharged into the annular discharge-chamber circumscribed by said last series of vanes. The steam flowing radially inward through the annular discharge-chamber passes successively through portions of the decreasing cross-section, thereby causing a material regeneration of the steam-pressure at the zone of maximum cross-section adjacent the inner edges of the final series of movable vanes 92. The zone of steam-pressure thus maintained adjacent the inner edges of such vanes acts in a very efficient manner to produce a reaction of the steam discharging therefrom.

From the above description it will be seen that the high velocity imparted to the steam by its expansion in the admission-ports 83 is fully utilized by a fractional absorption thereof in its impact on the successive series of vanes and that as the velocity of the steam is thus decreased it impinges upon the vanes moving at a decreased peripheral speed, whereby a satisfactory relation is maintained between the speed of the several sets of vanes and the steam impacting thereon with a resultant highly efficient operation throughout.

It will further be clear that some degree of reaction is obtained in the steam discharging from the several sets of moving vanes and that the whole construction provides a very efficient means for economical operation at a relatively low vane speed.

Fig. 2 illustrates a modified construction for permitting expansion of the parts under the heating of the actuating medium, in which a port-ring 10 is provided with radial slots 10ª, slidably engaging pins 10ᵇ in the turbine-casing. These pins support the port-ring from the periphery of the inclosed annular series of vanes and permit free expansion of its diameter under the influence of the heating of the actuating medium.

In Fig. 3 the inner set of movable vanes are shown secured to the turbine-wheel by an alternative construction, in which annular plates 99 are formed integral with or cast on the several vanes of each series, said plates being formed of greater width than the vanes to provide convenient means for bolting them to the turbine-wheel, as shown at 100.

Figs. 5, 6, 7, and 8 illustrate a modification of the construction shown in Fig. 1, in which the vanes of each succeeding series are formed of increased length and in which the turbine is provided with steam-heating chambers and automatic alarm devices. In this construction four successive annular series of movable vanes 101, 102, 103, and 104 are shown carried on each side of the turbine-wheel, the vanes of the successive series being formed of increased length. A plurality of annular series of stationary vanes 105, 106, and 107 are cast in or suitably secured to an annular member 108 in position to extend between the several series of movable vanes. The vanes of each stationary series are formed of a varying length, ranging from the length of the vanes of the next preceding, or outer, moving series to that of the vanes of the next succeeding, or inner, movable series. The annular members 108 are shown provided with annular chambers 109 and 110, which are connected by suitable passages 111. The outer chamber 109 is provided with one or more inlets 112 for supplying steam or other heating medium thereto. Suitable inlets are provided, preferably at the lower portion of said chambers, for the escape of the heating medium therefrom, and said inlets may be constructed to discharge in the turbine-exhaust, if desired. This provides a construction in which the heating medium circulates from the chamber 109 to the chamber 110 and enables the pressure and temperature of the heating medium in said chambers and their connecting-passages 111 to be maintained in a desired relation to the temperature of the steam passing through the particular sets of vanes adjacent thereto. This furnishes a simple means for imparting any desired varying amounts of heat to the steam at the different points of travel through the successive series of vanes. The annular members 108 are shown clamped between the two end members 113 of the turbine-casing, a packing 114 of heat-non-conducting material being preferably placed therebetween. An annular member 115, secured between two annular members 108, is provided with two independent annular steam-chambers 116, constructed to supply steam to the respective admission-ports 117 of the series of vanes on opposite sides of the turbine-wheel. Independent steam-supply pipes 118 are preferably provided for the two chambers 116 in order that either of them may be cut out independently, if desired. Each port 117 is shown provided with a groove in one of its walls for receiving any one of a series of interchangeable controlling-plugs 119 for varying the orifices of said port. As shown especially in Fig. 8, the several plugs are constructed of different thickness in order to extend to a more or less degree within the ports 117 for controlling the rate of expansion of the steam flowing through said ports. Contact-points 120 are shown electrically insulated at 121 in the annular member 115 and extending through said member into proximity to the path of contact-heads 122, carried by plungers 123, mounted in recesses 124 in the periphery of the turbine-wheel. Springs 125 are confined within said recesses against the outer faces of the plungers for normally maintaining said plungers seated against the inner ends of said recesses and for opposing the action of centrifugal force on said plungers during the rotation of the turbine-wheel. In the operation of this construction steam is maintained at any desired pressure within the annular chambers 116, from which it is directed through the ports 117 at an efficient angle against the outer periphery of the outermost annular series of vanes 101. The steam is discharged from the vanes 101 inwardly through the annular series of stationary vanes 105, which are constructed to direct it at an efficient angle against the second set 102 of movable vanes, which latter discharge the steam into the second set of stationary vanes 106. The vanes 106 direct the steam at an efficient angle against the third set 103 of movable vanes, and the above steps are repeated until the steam is finally discharged from the last set 104 of movable vanes into the interior of the turbine-casing, which is constructed to constitute an annular exhaust-chamber 126, provided with suitable lateral openings 127 for conducting the exhaust-steam to the atmosphere or to a condenser. The steam flowing inward through the annular exhaust-chamber 126 passes successively through portions of decreasing cross-section, thereby causing a material regeneration of its pressure at the zone of maximum cross-section adjacent the inner edges of the final series of movable vanes 104. The zone of steam-pressure thus maintained adjacent the inner edges of such vanes produce an efficient reaction in steam discharged therefrom and tends to augment the rotative force exerted by the steam on said vanes. A very advantageous operation of this construction can be obtained by expanding the steam in the ports 117 through practically its entire range and subsequently utilizing a fractional part of the high velocity thus imparted to the steam during its successive impact on the several series of vanes. However, under certain practical conditions it may be desirable to expand the steam through only a portion of its range in the admission-ports 117 and subsequently complete the expansion during its passage through the successive series of vanes. When saturated steam is employed in the operation of this construction, there will be a material condensation of the steam in its passage through the successive series of vanes, with a resultant heavy frictional load in the turbine. Heating chambers and passages 109, 110, and 111 provide a very efficient means for imparting sufficient heat to the actuating-steam at different points along its path through the vanes to prevent such condensation or to maintain the actuating-steam in a superheated condition throughout its operation, if desired. In case the speed of the turbine rises above that for which the parts have been adjusted the centrifugal force exerted upon the plungers 123 will project their contact-heads 122 sufficiently to engage the contact-points 120, and thereby complete an electric circuit between the turbine and said points which are electrically insulated therefrom. An alarm device may be placed in such circuit to notify the operator of any excess in the turbine speed, or said circuit may be arranged to operate a valve device for controlling the steam-supply in any well-known manner.

Figs. 9 and 10 illustrate a construction in which a plurality of turbine-wheels, similar to that shown in Fig. 5, are mounted on a common turbine-shaft 128. The several wheels carry on each face four concentric annular series of vanes 129, which are shown constructed and arranged like the movable vanes employed in the construction of Fig. 1. The end members 130 of the turbine-casing and stationary annular partitions 131, secured to a cylindrical member 132 of the casing, carry concentric annular series of vanes 133 in position to extend between the adjacent annular series of movable vanes.

Any desired number of wheels could obviously be employed; but I have illustrated three such wheels, to which steam is supplied from six independent annular steam-chambers 116. With this arrangement a highly efficient operation can be obtained through great variations of load by cutting off the steam-supply to one or more of the steam-chambers 116 without in any way throttling or affecting the remaining steam-supply.

Having thus described my invention, what I claim as new, and desire to secure by Letters Patent, is—

1. In a turbine, the combination of a turbine-wheel, an annular series of vanes extending axially from each side of said wheel and constituting the outer periphery of an inner annular chamber, and common means for securing the corresponding vanes of said two series to the wheel, substantially as described.

2. In a turbine, the combination of a turbine-wheel, an annular series of vanes extending axially from each side of said wheel and constituting the outer periphery of an inner annular chamber, and common bolts for securing the corresponding vanes of said two series to the wheel, substantially as described.

3. In a turbine, the combination of a turbine-wheel, an annular series of vanes extending radially from each side of said wheel and circumscribing an inner annular chamber, independent means constructed to direct steam radially inward through the respective series of vanes into the inner annular chambers, and an independent controlling device for each of said independent means, whereby the steam can be directed simultaneously through the two series of vanes or either of said series cut out without affecting the action of the other, substantially as described.

4. In a turbine, the combination of a turbine-wheel, a plurality of concentric annular series of axially-extending vanes carried on each side of said wheel and circumscribing an inner annular chamber, means constructed to provide free communication between said two annular chambers, and means constructed to direct steam radially inward through the successive concentric annular series of vanes into said annular chambers, substantially as described.

5. In a turbine, the combination of a plurality of turbine-wheels mounted on a common shaft, a set of concentric annular series of axially-extending vanes carried on each side of the several wheels and circumscribing an inner annular chamber, means constructed to provide free communication between said several annular chambers, an independent means constructed to direct steam radially inward through the successive concentric annular series of vanes of each set into said inner annular chamber, and means constructed to control the steam-supply from any of said sets of vanes, substantially as described.

6. In a turbine, the combination of a turbine-wheel, a plurality of concentric annular series of axially-extending vanes carried on said wheel and circumscribing a common inner annular chamber, a plurality of annular series of stationary vanes supported on the casing to extend between the several series of wheel-vanes, and common means for adjusting the vanes of said several stationary series, substantially as described.

7. In a turbine, the combination of a turbine-wheel, a plurality of concentric annular series of vanes carried on said wheel and circumscribing a common inner annular chamber, means constructed to direct steam radially inward through the successive concentric annular series of vanes into said common chamber, and means constructed to impart heat to the steam at different points along its passage through said vanes, substantially as described.

8. In a turbine, the combination of a turbine-wheel, a plurality of concentric annular series of vanes carried on said wheel and circumscribing a common inner annular chamber, means constructed to direct steam radially inward through the successive concentric annular series of vanes into said common chamber, and means constructed to impart heat to the steam at different points along its passage through said vanes in amounts proportionate to the temperature and condition of the steam at such points, substantially as described.

9. In a turbine, the combination of a turbine-wheel, a plurality of concentric annular series of axially-extending vanes carried on said wheel, said vanes constructed with ends lying in parallel planes and each series comprising vanes of lesser length than those of the series lying nearer the wheel-center, and a plurality of annular series of stationary vanes supported intermediate said several annular series of wheel-vanes, each of said stationary vanes formed with one end lying in a plane parallel to that of the ends of the wheel-vanes and with its other end inclined to vary the length of such stationary vane between the lengths of the two adjacent series of wheel-vanes, substantially as described.

10. In a turbine, the combination of a turbine-wheel, an annular series of vanes carried by said wheel, an annular port member surrounding the outer periphery of said annular series of vanes and provided with a plurality of admission-ports, and supporting means for said annular port member constructed to permit free expansion of the latter in radially-outward directions, substantially as described.

11. In a turbine, the combination of a turbine-wheel, an annular series of vanes carried by said wheel, a port member surrounding the outer periphery of said annular series of vanes and provided with a plurality of admission-ports, slots formed in said port member, and supporting-pins engaging said slots to permit free expansion of the port member in radiallly-outward directions, substantially as described.

12. In a turbine, the combination of a plurality of ports, a set of interchangeable stationary controlling means for varying the orifice of each of said several ports, and means for securing any desired controlling means of such sets to each of said ports, substantially as described.

13. In a turbine, the combination of a plurality of ports provided with grooves, and a set of stationary interchangeable plugs for varying the orifices of each of said several ports, said plugs constructed to engage said grooves for securing them in position, substantially as described.

In testimony whereof I affix my signature in presence of two witnesses.

RICHARD H. GOLDSBOROUGH.

Witnesses:
G. AYRES,
CHARLES LOWELL HOWARD.